Patented Feb. 23, 1926.

1,573,888

UNITED STATES PATENT OFFICE.

PAUL G. WILLETTS, OF BERLIN, CONNECTICUT, ASSIGNOR TO HARTFORD-EMPIRE COMPANY, OF HARTFORD, CONNECTICUT, A CORPORATION OF DELAWARE.

HIGH-TEMPERATURE CEMENT.

No Drawing.  Application filed November 13, 1925. Serial No. 68,917.

*To all whom it may concern:*

Be it known that I, PAUL G. WILLETTS, a citizen of the United States, residing at Berlin, in the county of Hartford and State of Connecticut, have invented certain new and useful Improvements in High-Temperature Cement, of which the following is a specification.

My invention relates to cements intended particularly for use under high temperature conditions, as in sealing the joints of annealing lehrs, sealing the joints between glass-house refractory parts, and for other similar purposes.

My improved cement is prepared by mixing barium sulphate, silica and an aqueous solution of sodium silicate.

White glass sand is a suitable source of silica for this purpose, and should preferably be of such fineness as to pass through a 30-mesh screen. The barium sulphate, preferably ground to the same degree of fineness as the sand, is mixed with the sand in about the proportions of 60 parts of barium sulphate to 40 parts of the sand. This mixture is made up into a paste with an aqueous solution of sodium silicate of about 43° Bé.

The sodium silicate employed should be at least moderately high in soda content. The U-brand sodium silicate made by the Philadelphia Quartz Company of Philadelphia, Pa., and containing 32.9% of $SiO_2$ and 13.7% of $Na_2O$, is well suited for this purpose. A sodium silicate containing 8.9% of $Na_2O$ has been found to be unsatisfactory for my present purpose. The U-brand sodium silicate is diluted from its original concentration of 52° Bé. to about 43° Bé. before being mixed with the other ingredients.

One quart of a 43° solution of the U-brand of sodium silicate is sufficient to make a proper cement paste for the present purposes when mixed with about 14 pounds of the barium sulphate-silica mixture described above.

This cement is applied in the form of a paste and quickly hardens to a solid mass. When heated, the ingredients of the cement react and produce a hard, flinty structure which, however, is sufficiently yielding to prevent the cement from shattering when exposed to varying temperatures and pressures. It is well adapted for sealing the joints between metal parts, such as are found in glass-annealing lehrs of the type disclosed in the U. S. patent to Mulholland, No. 1,560,481, granted November 3, 1925. This cement is also useful in sealing and repairing refractory parts that are exposed to high temperatures, such as the blocks and shapes employed in glass tanks and glass feeders, and for general use under high temperature conditions.

This cement has the special advantage that it may be highly heated without shrinkage, the natural tendency toward contraction of the barium sulphate being more than offset by the expansion of the silica. This property of the cement renders it valuable for making gas-tight joints between metal parts, as in annealing lehrs of the type mentioned above. The permanent and continued expansion of the cement, when heated, enables the metal parts to be repeatedly heated and cooled without impairing the tightness of the heated joints.

The proportions stated above, and the specific brand of sodium silicate mentioned, have been found to give good results, but it will be understood that these may be varied within the scope of the appended claims.

I claim as my invention:

1. A cement containing barium sulphate, silica and silicate of soda.

2. A cement for high-temperature uses produced by mixing barium sulphate, silica and an aqueous solution of silicate of soda.

3. A cement for high-temperature uses containing barium sulphate, silica and silicate of soda, and capable of being heated without shrinkage.

4. The process of making a cement that comprises mixing barium sulphate and silica, and adding sufficient aqueous solution of silicate of soda to produce a paste.

5. The process of making a cement that comprises mixing about 60 parts of barium sulphate with about 40 parts of silica sand, and making the mixture to a paste with an aqueous solution of sodium silicate.

6. The process of making a cement that comprises mixing about 60 parts of barium sulphate with about 40 parts of silica sand, and making the mixture to a paste with an aqueous solution of sodium silicate of about 43° Bé.

7. The process of making a cement which comprises mixing about 60 parts of sodium silicate with about 40 parts of silica sand, and adding to the mixture an aqueous solution of sodium silicate of about 43° Bé. in the proportion of about 14 pounds of the dry mixture to 1 quart of the said solution.

8. The process of making a cement that comprises mixing about 60 parts of dry barium sulphate with about 40 parts of dry silica sand, both of sufficient fineness to pass through a 30-mesh screen, and adding to the said mixture an aqueous solution of sodium silicate of about 43° Bé. in a proportion of about 14 pounds of said dry mixture to about 1 quart of said solution.

Signed at Hartford, Connecticut this 11th day of November 1925.

PAUL G. WILLETTS.